United States Patent
Kitagawa et al.

(10) Patent No.: US 8,355,102 B2
(45) Date of Patent: Jan. 15, 2013

(54) LIQUID CRYSTAL PANEL AND LIQUID CRYSTAL DISPLAY APPARATUS

(75) Inventors: Takeharu Kitagawa, Osaka (JP); Kentarou Takeda, Osaka (JP); Nao Murakami, Osaka (JP); Hiroyuki Yoshimi, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 287 days.

(21) Appl. No.: 12/597,991

(22) PCT Filed: Apr. 23, 2008

(86) PCT No.: PCT/JP2008/057810
§ 371 (c)(1),
(2), (4) Date: Oct. 28, 2009

(87) PCT Pub. No.: WO2008/139862
PCT Pub. Date: Nov. 20, 2008

(65) Prior Publication Data
US 2010/0110347 A1 May 6, 2010

(30) Foreign Application Priority Data

May 16, 2007 (JP) ................................. 2007-130254
Aug. 2, 2007 (JP) ................................. 2007-201562
Feb. 18, 2008 (JP) ................................. 2008-035733

(51) Int. Cl.
*G02F 1/1335* (2006.01)
(52) U.S. Cl. ....................................................... 349/119
(58) Field of Classification Search ................... 349/119
See application file for complete search history.

(56) References Cited

U.S. PATENT DOCUMENTS

| 6,141,075 | A | 10/2000 | Ohmuro et al. |
| 6,567,216 | B2 | 5/2003 | Suzuki et al. |
| 7,012,663 | B2 | 3/2006 | Ono et al. |
| 7,110,177 | B2 | 9/2006 | Sugino et al. |
| 7,289,226 | B2 | 10/2007 | Hill |
| 7,319,500 | B2 | 1/2008 | Yoshida et al. |
| 7,582,339 | B2 * | 9/2009 | Kim et al. ........................ 428/1.3 |
| 7,643,117 | B2 * | 1/2010 | Iida et al. ........................ 349/117 |

(Continued)

FOREIGN PATENT DOCUMENTS

CN 1946776 A 4/2007

(Continued)

OTHER PUBLICATIONS

International Search Report of PCT/JP2008/057810, mailing date of May 27, 2008.

(Continued)

*Primary Examiner* — James Dudek
(74) *Attorney, Agent, or Firm* — Westerman, Hattori, Daniels & Adrian, LLP

(57) ABSTRACT

There is provided a liquid crystal panel exhibiting a high contrast ratio and a liquid crystal display apparatus including the liquid crystal panel. The liquid crystal panel of the present invention includes a first polarizer, a first optical compensation layer, a liquid crystal cell, a second optical compensation layer, and a second polarizer in the stated order from a viewer side. The first optical compensation layer and the second optical compensation layer have a refractive index profile of $nx > ny > nz$, and a light transmittance ($T_2$) of the second polarizer is larger than a light transmittance ($T_1$) of the first polarizer.

9 Claims, 3 Drawing Sheets

U.S. PATENT DOCUMENTS

| | | | |
|---|---|---|---|
| 2001/0030726 A1 | 10/2001 | Yoshida et al. | |
| 2002/0044236 A1 | 4/2002 | Suzuki et al. | |
| 2003/0004278 A1 | 1/2003 | Asano et al. | |
| 2004/0119924 A1 | 6/2004 | Takeda et al. | |
| 2004/0239852 A1 | 12/2004 | Ono et al. | |
| 2005/0105027 A1* | 5/2005 | Wada et al. | 349/117 |
| 2005/0285998 A1* | 12/2005 | Saita et al. | 349/117 |
| 2006/0105117 A1 | 5/2006 | Kim et al. | |
| 2009/0295000 A1 | 12/2009 | Kim et al. | |

FOREIGN PATENT DOCUMENTS

| | | |
|---|---|---|
| JP | 55-152516 U | 11/1980 |
| JP | 1-240517 A | 9/1989 |
| JP | 3-14882 A | 1/1991 |
| JP | 3-122137 A | 5/1991 |
| JP | 10-221684 A | 8/1998 |
| JP | 11-038406 A | 2/1999 |
| JP | 11-258605 A | 9/1999 |
| JP | 2000-230016 A | 8/2000 |
| JP | 2000-315144 A | 11/2000 |
| JP | 2001-151814 A | 6/2001 |
| JP | 2001-343529 A | 12/2001 |
| JP | 2002-120326 A | 4/2002 |
| JP | 2002-254544 A | 9/2002 |
| JP | 2004-70296 A | 3/2004 |
| JP | 3648240 B2 | 5/2005 |
| JP | 2005-146084 A | 6/2005 |
| JP | 2005-331773 A | 12/2005 |
| JP | 2006-018317 A | 1/2006 |
| JP | 2006-091369 A | 4/2006 |
| JP | 2006-317495 A | 11/2006 |
| JP | 2009-098663 A | 5/2009 |
| KR | 2006-0054165 A | 5/2006 |
| TW | 504590 B | 10/2002 |
| TW | 554197 B | 9/2003 |
| WO | 2006/052116 A1 | 5/2006 |

OTHER PUBLICATIONS

Chinese Office Action dated Apr. 1, 2011, issued in corresponding Chinese Patent Application No. 200880016030.4.

Korean Office Action dated May 11, 2011, issued in corresponding Korean Patent Applicatiion No. 2009-7023777.

Publication Submission dated Nov. 1, 2011, issued in corresponding Japanese Patent Application No. 2008-35733.

Notification from the Japanese Patent Office dated Nov. 30, 2011, regarding Publication Submission.

Taiwanese Office Action dated Mar. 26, 2012, issued in corresponding Taiwanese Patent Application No. 097115983, with English translation (12 pages).

* cited by examiner

LIQUID CRYSTAL PANEL AND LIQUID CRYSTAL DISPLAY APPARATUS

TECHNICAL FIELD

The present invention relates to a liquid crystal panel including two optical compensation layers having a predetermined refractive index profile and two polarizers with light transmittances adjusted.

BACKGROUND ART

A liquid crystal display apparatus (hereinafter, referred to as an LCD) displays characters and images, using the electrooptical characteristics of liquid crystal molecules. The LCD generally uses a liquid crystal panel in which polarizing plates are placed on both sides of a liquid crystal cell, and can display a black image under no voltage application in a normally black mode, for example. The LCD has a problem in that a contrast ratio in front and oblique directions is low. In order to solve this problem, a liquid crystal panel using a retardation film has been disclosed (for example, see Patent Document 1). However, the further increase in performance of the LCD is desired on the market, and as one example, there is a demand for a liquid crystal panel exhibiting a higher contrast ratio, capable of outputting characters and images clearly.

Patent Document 1: JP 3648240

DISCLOSURE OF THE INVENTION

Problems to be solved by the Invention

The present invention has been made in view of solving the above-mentioned problems, and an object of the present invention is to provide a liquid crystal panel exhibiting a high contrast ratio and a liquid crystal display apparatus including the liquid crystal panel.

Means for Solving the Problems

A liquid crystal panel according to an embodiment of the present invention includes a first polarizer, a first optical compensation layer, a liquid crystal cell, a second optical compensation layer, and a second polarizer in the stated order from a viewer side, wherein each of the first optical compensation layer and the second optical compensation layer has a refractive index profile of nx>ny>nz, and a light transmittance ($T_2$) of the second polarizer is larger than a light transmittance ($T_1$) of the first polarizer.

In one embodiment of the invention, an absolute value of a photoelastic coefficient of each of the first optical compensation layer and the second optical compensation layer is $40 \times 10^{-12}$ (m$^2$/N) or less.

In another embodiment of the invention, the first optical compensation layer and the second optical compensation layer are polymer films containing a cyclic olefin-based resin or a cellulose-based resin.

In still another embodiment of the invention, a difference ($\Delta T = T_2 - T_1$) between the light transmittance ($T_2$) of the second polarizer and the light transmittance ($T_1$) of the first polarizer is 0.1% to 6.0%.

In still another embodiment of the invention, the liquid crystal cell contains liquid crystal molecules aligned homeotropically.

In still another embodiment of the invention, the light transmittance ($T_1$) of the first polarizer is 38.3% to 43.3%.

In still another embodiment of the invention, the light transmittance ($T_2$) of the second polarizer is 41.1% to 44.3%.

In still another embodiment of the invention, a polarization degree of at least one of the first polarizer and the second polarizer is 99% or more.

In still another embodiment of the invention, at least one of the first polarizer and the second polarizer comprises a polyvinyl alcohol-based resin containing iodine.

In still another embodiment of the invention, a difference ($\Delta I = I_1 - I_2$) between an iodine content ($I_1$) of the first polarizer and an iodine content ($I_2$) of the second polarizer is 0.1% by weight to 2.6% by weight.

In still another embodiment of the invention, at least one of the iodine content ($I_1$) of the first polarizer and the iodine content ($I_2$) of the second polarizer is 1.8% by weight to 5.0% by weight.

According to another aspect of the present invention, a liquid crystal display apparatus is provided. The liquid crystal display apparatus includes the liquid crystal panel as described above.

Effects of the Invention

According to the present invention, a liquid crystal panel exhibiting a high contrast ratio and a liquid crystal display apparatus including the liquid crystal panel may be provided. Such an effect may be obtained by placing polarizers with light transmittances adjusted and optical compensation layers having a predetermined refractive index profile on both sides of a liquid crystal cell.

DESCRIPTION OF REFERENCE NUMERALS

Figure 1:
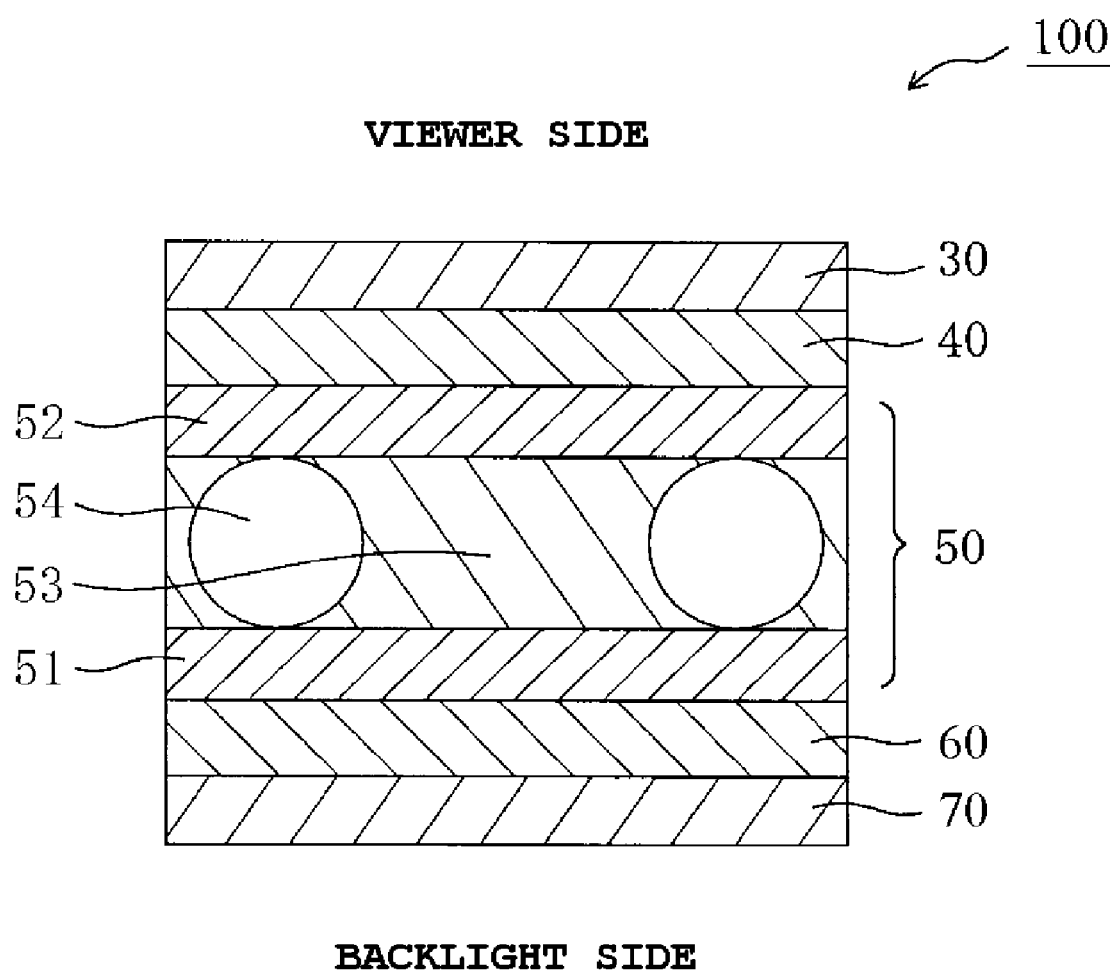
FIG. 1 A schematic cross-sectional view of a liquid crystal panel according to a preferred embodiment of the present invention.

| | |
|---|---|
| 30 | First polarizer |
| 40 | First optical compensation layer |
| 50 | Liquid crystal cell |
| 51, 52 | Substrate |
| 53 | Liquid crystal layer |
| 54 | Spacer |
| 60 | Second optical compensation layer |
| 70 | Second polarizer |
| 80 | Backlight unit |
| 81 | Light source |

| | -continued |
|---|---|
| 82 | Reflective film |
| 83 | Diffusion plate |
| 84 | Prism sheet |
| 85 | Brightness enhancing film |
| 100 | Liquid crystal panel |
| 200 | Liquid crystal display apparatus |
| 301 | Polymer film containing as a main component a polyvinyl alcohol-based resin |
| 300 | Feed part |
| 310 | Swelling bath |
| 320 | Coloring bath |
| 311, 312, 321, 322, 331, 332, 341, 342, 351, 352 | Roll |
| 330 | First cross-linking bath |
| 340 | Second cross-linking bath |
| 350 | Water washing bath |
| 360 | Drying means |
| 370 | Polarizer |
| 380 | Take-up part |

BEST MODE FOR CARRYING OUT THE INVENTION

<Definition of Terms and Symbols>

The definition of the terms and symbols in the specification of the present invention are as follows.

(1) Light Transmittance of Polarizer

A light transmittances (T) of a polarizer refers to a Y value obtained through visibility correction by a two-degree field of view (C light source) in accordance with JIS Z 8701-1982.

(2) Refractive Index (nx, ny and nz)

"nx" represents a refractive index in a direction in which an in-plane refractive index becomes maximum (i.e., in a slow axis direction), "ny" represents a refractive index in a direction perpendicular to the slow axis in the same plane (i.e., in a fast axis direction), and "nz" represents a refractive index in a thickness direction.

(3) In-Plane Retardation Value

An in-plane retardation value ($Re[\lambda]$) refers to an in-plane retardation value of a film at a wavelength $\lambda$ (nm) at 23° C. $Re[\lambda]$ is obtained by $Re[\lambda]=(nx-ny)\times d$ where the thickness of the film is d (nm). The subscripts "1", "2", and "LC" attached to the in-plane retardation value ($Re[\lambda]$) described in the specification of the present invention represents a first optical compensation layer, a second optical compensation layer, and a liquid crystal cell, respectively. For example, an in-plane retardation value of the first optical compensation plate is represented as $Re_1$.

(4) Thickness Direction Retardation Value

A thickness direction retardation value ($Rth[\lambda]$) refers to a retardation value in a film thickness direction at a wavelength $\lambda$ (nm) at 23° C. $Rth[\lambda]$ is obtained by $Rth[\lambda]=(nx-nz)\times d$ where the thickness of the film is d (nm). The subscripts "1", "2", and "LC" attached to the thickness direction retardation value ($Rth[\lambda]$) described in the specification of the present invention represents a first optical compensation layer, a second optical compensation layer, and a liquid crystal cell, respectively. For example, an thickness direction retardation value of the first optical compensation plate is represented as $Rth_1$.

(5) Nz Coefficient

An Nz coefficient is obtained by $Nz=Rth[590]/Re[590]$.

(6) In the specification of the present invention, the phrase "nx=ny" or "ny=nz" not only refers to a case where they are completely equal but also includes a case where they are substantially equal. Therefore, for example, the phrase "nx=ny" includes a case where $Re[590]$ is less than 10 nm.

(7) In the specification of the present invention, the phrase "substantially perpendicular" includes a case where an angle formed by two optical axes is 90°±2.0°, and preferably 90°±1.0°. The phrase "substantially parallel" includes a case where an angle formed by two optical axes is 0°±2.0°, and preferably 0°±1.0°.

<A. Outline of a Liquid Crystal Panel>

A liquid crystal panel of the present invention includes a first polarizer, a first optical compensation layer, a liquid crystal cell, a second optical compensation layer, and a second polarizer in the stated order from a viewer side. The first optical compensation layer and the second optical compensation layer have a refractive index profile of nx>ny≥nz. A light transmittance ($T_2$) of the second polarizer is larger than a light transmittance ($T_1$) of the first polarizer. Such a liquid crystal panel has a feature in that a contrast ratio is remarkably higher compared to a conventional liquid crystal panel (typically, those of which the light transmittances of two polarizers placed on both sides of a liquid crystal cell are the same). Thus, it is the first finding by the inventors of the present invention that a contrast ratio is largely enhanced by placing the polarizers with light transmittances adjusted and the optical compensation layers having a predetermined refractive index profile on both sides of a liquid crystal cell, which is an unexpected outstanding effect.

A difference ($\Delta T=T_2-T_1$) between a light transmittance ($T_2$) of the second polarizer and a light transmittance ($T_1$) of the first polarizer is preferably 0.1% to 6.0%, more preferably 0.1% to 4.5%, particularly preferably 0.2% to 3.0%, and most preferably 0.2% to 1.5%. By using two polarizer having a difference in light transmittance in the above range, the liquid crystal panel of the present invention with a much higher contrast ratio in a front direction can be obtained.

FIG. 1 is a schematic cross-sectional view illustrating a preferred example of the liquid crystal panel of the present invention. A liquid crystal panel 100 includes a first polarizer 30, a first optical compensation layer 40, a liquid crystal cell 50, a second optical compensation layer 60, and a second polarizer 70 in the stated order from a viewer side. In the illustrated example, although a transmissive type liquid crystal panel having a backlight is described, the present invention may also be applied to a reflection type liquid crystal panel having no backlight. Although not shown, if required, a first protective layer is provided between the first polarizer 30 and the first optical compensation layer 40, and a second protective layer is provided on a side of the first polarizer 30 opposite to the first optical compensation layer 40. Further, although not shown, if required, a third protective layer is provided between the second polarizer 70 and the second optical compensation layer 60, and a fourth protective layer is provided on a side of the second polarizer 70 opposite to the second optical compensation layer 60. If the first protective layer (third protective layer) is not provided, the first optical compensation layer 40 (second optical compensation layer 60) may also function as a protective layer of the first polarizer 30 (second polarizer 70). The function of the first optical compensation layer 40 (second optical compensation layer 60) as a protective layer may contribute to the reduction in thickness of a liquid crystal panel. The respective optical compensation layers, polarizers, liquid crystal cell, and protective layers are attached to each other via any appropriate pressure-sensitive adhesive layer or adhesive layer.

In the liquid crystal panel 100, the first polarizer 30 and the second polarizer 70 are typically placed so that absorption axes are substantially perpendicular to each other.

The slow axis of the first optical compensation layer 40 is placed so as to form any suitable angle with respect to the absorption axis of the first polarizer 30, depending upon the purpose, the configuration of a panel, and the like. For example, the first polarizer 30 and the first optical compensation layer 40 are placed so that the absorption axis of the first polarizer and the slow axis of the first compensation layer are substantially perpendicular to each other. The first polarizer 30 and the first optical compensation layer 40 are placed with such a particular positional relationship, whereby a contrast ratio may be enhanced.

The slow axis of the second optical compensation layer 60 is placed so as to form any suitable angle with respect to the absorption axis of the first polarizer 30, depending upon the purpose, the configuration of the panel, and the like. For example, the first polarizer 30 and the second optical compensation layer 60 are placed so that the absorption axis of the first polarizer and the slow axis of the second optical compensation layer are substantially parallel to each other. In other words, the first optical compensation layer 40 and the second optical compensation layer 60 are placed so that the slow axes of those are substantially perpendicular to each other. The first polarizer 30 and the second optical compensation layer 60 are placed with such a particular positional relationship, whereby a contract ratio may be enhanced.

The liquid crystal panel is preferably in a normally black mode. In the specification of the present invention, the term "normally black mode" refers to a liquid crystal panel in which a light transmittance becomes minimum (a screen becomes dark) under no voltage application, and the light transmittance increases under voltage application. The effect of enhancing a contrast ratio is particularly remarkable in a liquid crystal panel in a normally black mode, which performs a black display under no voltage application. It is considered that the effect obtained by using two polarizer having different light transmittances and two optical compensation layers is not inhibited by the driving of liquid crystal molecules.

<B. Liquid Crystal Cell>

As the liquid crystal cell used in the present invention, any suitable one can be adopted. Examples of the above liquid crystal cell include an active matrix type using a thin film transistor and a passive matrix type adopted in a super-twisted nematic liquid crystal display apparatus.

The liquid crystal cell preferably includes a pair of substrates 51, 52 and a liquid crystal layer 53 as a display medium placed between the pair of substrates. On one substrate (active matrix substrate), switching elements (typically, TFTs) for controlling the electrooptical characteristics of liquid crystal, and scanning lines that provide a gate signal to the switching elements and signal lines that provide a source signal to the switching elements are provided. On the other substrate (color filter substrate), a color filter is provided.

The color filter may be provided on the active matrix substrate. Alternatively, in the case where an RGB 3-color light source (which may further include a multi-color light source) is used for illumination means of a liquid crystal display apparatus as in a field sequential system, the above-mentioned color filter can be omitted. The interval between two substrates is controlled with spacers 54. On a side of each substrate, which is in contact with a liquid crystal layer, an alignment film made of, for example, polyimide is provided. Alternatively, for example, in the case where the initial alignment of liquid crystal molecules is controlled using a fringe electric field formed by a patterned transparent electrode, the alignment film can be omitted.

The liquid crystal cell preferably contains liquid crystal molecules arranged in a homeotropic alignment. In the specification of the present invention, the term "homeotropic alignment" refers to the state in which an alignment vector of liquid crystal molecules is aligned vertically (in a normal direction) with respect to the plane of a substrate as a result of the interaction between the substrate subjected to an alignment treatment and liquid crystal molecules. The homeotropic alignment also includes the case where the alignment vector of liquid crystal molecules is slightly inclined with respect to the direction normal to a substrate, i.e., the case where liquid crystal molecules have a pretilt. In the case where liquid crystal molecules have a pretilt, the pretilt angle (angle from the normal line of the substrate) is preferably 5° or less. By setting the pretilt angle in the above range, a liquid crystal display apparatus with a high contrast ratio can be obtained.

In the liquid crystal cell, preferably, a refractive index ellipsoid has a relationship of nz>nx=ny. Examples of the driving mode using a liquid crystal cell in which a refractive index ellipsoid has a relationship of nz>nx=ny include a vertical alignment (VA) mode, a twisted nematic (TN) mode, a vertical alignment type electric field control birefringence (ECB) mode, and an optical compensation birefringence (OCB) mode. Preferably, the liquid crystal cell is in a vertical alignment (VA) mode.

Figure 2:
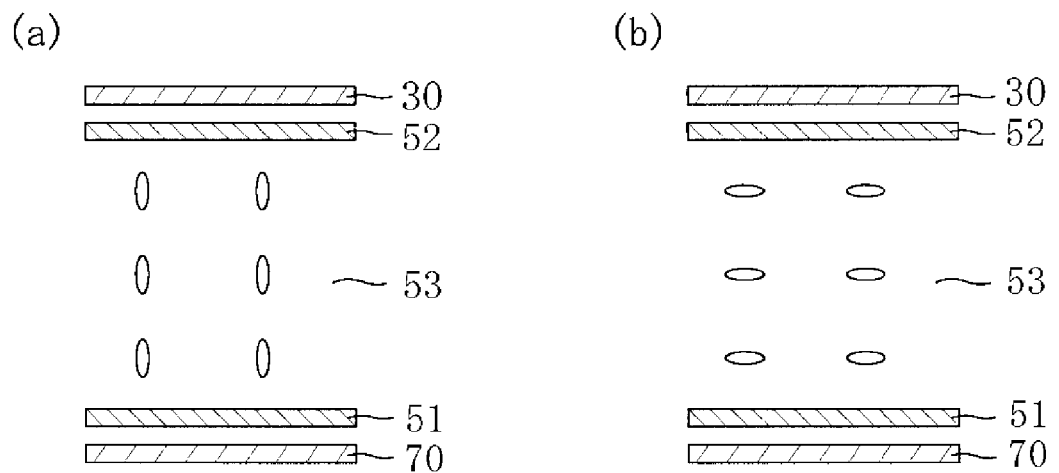
FIG. 2(a) A schematic cross-sectional view illustrating an alignment state of liquid crystal molecules in a liquid crystal layer under no voltage application in the case where a liquid crystal cell in a VA mode is adopted in a liquid crystal display apparatus of the present invention.
FIG. 2(b) A schematic cross-sectional view illustrating an alignment state of liquid crystal molecules in a liquid crystal layer under no voltage application in the case where a liquid crystal cell in a VA mode is adopted in a liquid crystal display apparatus of the present invention.

FIG. 2 is a schematic cross-sectional view illustrating an alignment state of liquid crystal molecules in a VA mode. As shown in FIG. 2(a), liquid crystal molecules are aligned vertically to the substrates 51, 52 without application of a voltage. Such vertical alignment is realized by arranging nematic liquid crystal having negative dielectric anisotropy between the substrates each having a vertical alignment film formed thereon (not shown). When light enters from a surface of one substrate 51 in such a state, linear polarized light incident upon the liquid crystal layer 53 through a second polarizer 70 advances along a longitudinal direction of the vertically aligned liquid crystal molecules. No birefringence occurs in the longitudinal direction of the liquid crystal molecules, and thus the incident light advances without changing a polarization direction and is absorbed by a first polarizer 30 having an absorption axis perpendicular to the second polarizer 70. In this way, a dark state is displayed without application of a voltage (normally black mode). As shown in FIG. 2(b), longitudinal axes of the liquid crystal molecules are aligned parallel to the substrate surfaces when a voltage is applied between the electrodes. The liquid crystal molecules in such a state exhibit birefringence with respect to linear polarized light incident upon the liquid crystal layer 53, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the first polarizer 30, and a bright state is displayed. Upon termination of voltage application, the display is returned to a dark state by an alignment restraining force. An applied voltage is changed to control inclination of the liquid crystal molecules, so as to change an intensity of light transmission from the first polarizer 30. As a result, display of gradation can be realized.

The liquid crystal cell of a VA mode may be set to be a multi-domain by using an electrode with a slit or a base material with protrusions formed on its surface, as described in JP 11-258605 A, for example.

Rth$_{LC}$[590] under no electric field application of the liquid crystal cell is preferably −500 nm to −200 nm, and more preferably −400 nm to −200 nm. The above Rth$_{LC}$[590] is appropriately set based on the birefringence of liquid crystal molecules and a cell gap. The cell gap (substrate interval) of the liquid crystal cell is generally 1.0 µm to 7.0 µm.

<C. Polarizer>

As polarizer (a first polarizer and a second polarizer) used in the present invention, any suitable polarizer can be adopted as long as a light transmittance satisfies the relationship of $T_2 > T_1$. In the specification of the present invention, the term "polarizer" refers to the optical element that converts natural light or polarized light into linearly polarized light. Preferably, the polarizer has a function of separating incident light into two polarized light components whose polarization directions are perpendicular to each other, and transmits one polarized light component and absorbs, reflects, and/or scatters the other polarized light component.

The first polarizer is placed on the viewer side of the liquid crystal cell, and the second polarizer is placed on a side opposite thereto (for example, on the backlight side). Because a larger amount of light is incident upon the liquid crystal cell when a polarizer with a high light transmittance is placed on the backlight side, a high brightness (white brightness) may be obtained in a white image and a color display. On the other hand, the incident light becomes unlikely to leak to the viewer side when a polarizer with a low light transmittance is placed on the viewer side. Therefore, a brightness (brightness in a black display) may be suppressed to be low when a black image is displayed. Consequently, a liquid crystal panel with a high contrast ratio may be obtained.

The light transmittance ($T_1$) of the first polarizer is preferably 38.3% to 43.3%, more preferably 38.6% to 43.2%, particularly preferably 38.9% to 43.1%, and most preferably 39.2% to 43.0%. By setting $T_1$ in the above range, a liquid crystal display apparatus with much higher contrast ratio in a front direction can be obtained.

The light transmittance ($T_2$) of the second polarizer is preferably 41.1% to 44.3%, more preferably 41.4% to 44.3%, particularly preferably 41.7% to 44.2%, and most preferably 42.0% to 44.2%. By setting $T_2$ in the above range, a liquid crystal display apparatus with much higher contrast ratio in a front direction can be obtained.

The light transmittance ($T_1$, $T_2$) of the polarizer is preferably adjusted suitably to obtain higher contrast ratio in a front direction in accordance with, for example, the driving mode of the liquid crystal cell and application of the liquid crystal panel. As a method of increasing or decreasing the light transmittance of the polarizer, for example, in the case where the polarizer mainly containing a polyvinyl alcohol-based resin containing iodine is used, there is a method of adjusting the content of iodine in the polarizer. Specifically, when the content of iodine in the polarizer is increased, the light transmittance of the polarizer can be decreased. When the content of iodine in the polarizer is decreased, the light transmittance of the polarizer can be increased. This method is also applicable for producing a roll-shaped polarizer and a sheet-shaped polarizer. The details of the production method of polarizer will be described later.

The degree of polarization (P) of the first polarizer and/or the second polarizer is preferably 99% or more, more preferably 99.5% or more, and much more preferably 99.8%. By setting the degree of polarization (P) in the above range, a liquid crystal display apparatus with much higher contrast ratio in a front direction can be obtained.

The degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizer; and using the following equation: degree of polarization (%)=$\{(H_0-H_{90})/(H_0+H_{90})\}^{1/2} \times 100$. The parallel light transmittance ($H_0$) refers to a light transmittance of a parallel laminate polarizer produced by piling two identical polarizer such that respective absorption axes are parallel to each other. The perpendicular light transmittance ($H_{90}$) refers to a light transmittance of a perpendicular laminate polarizer produced by piling two identical polarizer such that respective absorption axes are perpendicular to each other. Those light transmittances refer to a Y value obtained through visibility correction by a two-degree field of view (C light source) in accordance with JIS Z8701-1982.

Each of the first polarizer and the second polarizer typically contains as a main component a polyvinyl alcohol-based resin with iodine. The polarizer can generally be obtained by stretching a polymer film containing as a main component a polyvinyl alcohol-based resin with iodine. Such a polarizer has excellent optical properties.

The relationship between the iodine content ($I_1$) of the first polarizer and the iodine content ($I_2$) of the second polarizer is preferably $I_1 > I_2$. The difference ($\Delta I = I_1 - I_2$) between the iodine content ($I_1$) of the first polarizer and the iodine content ($I_2$) of the second polarizer is preferably 0.1% by weight to 2.6% by weight, more preferably 0.1% by weight to 2.0% by weight, particularly preferably 0.1% by weight to 1.4% by weight, and most preferably 0.15% by weight to 0.8% by weight. By setting the relationship of the iodine contents of the respective polarizers in the above range, a polarizer having a light transmittance relationship in a preferred range is obtained, whereby a liquid crystal panel with high contrast ratio in a front direction can be obtained.

The iodine content of each of the first polarizer and the second polarizer is preferably 1.8% by weight to 5.0% by weight, and more preferably 2.0% by weight to 4.0% by weight. The iodine content of the first polarizer is preferably 2.3% by weight to 5.0% by weight, more preferably 2.5% by weight to 4.5% by weight, and particularly preferably 2.5% by weight to 4.0% by weight. The iodine content of the second polarizer is preferably 1.8% by weight to 3.5% by weight, more preferably 1.9% by weight to 3.2% by weight, and particularly preferably 2.0% by weight to 2.9% by weight. By setting the iodine content of each polarizer in the above range, a polarizer with a light transmittance in a preferred range is obtained, whereby a liquid crystal panel with high contrast ratio in a front direction can be obtained.

Preferably, each of the first polarizer and the second polarizer further contains potassium. The potassium content is preferably 0.2% by weight to 1.0% by weight, more preferably 0.3% by weight to 0.9% by weight, and particularly preferably 0.4% by weight to 0.8% by weight. By setting the potassium content in the above range, a polarizer with a light transmittance in a preferred range and high degree of polarization can be obtained.

Preferably, each of the first polarizer and the second polarizer further contains boron. The boron content is preferably 0.5% by weight to 3.0% by weight, more preferably 1.0% by weight to 2.8% by weight, and particularly preferably 1.5% by weight to 2.6% by weight. By setting the boron content in the above range, a polarizer with a light transmittance in a preferred range and high degree of polarization can be obtained.

The polyvinyl alcohol-based resin may be prepared by saponifying vinyl ester-based polymer obtained by polymerizing a vinyl ester-based monomer. A degree of saponification of the polyvinyl alcohol-based resin is preferably 95.0 mol % to 99.9 mol %. The degree of saponification of the polyvinyl alcohol-based resin may be determined in accordance with JIS K6726-1994. Use of the polyvinyl alcohol-based resin, the degree of saponification of which falls within the above ranges, can provide a polarizer having excellent durability.

The polyvinyl alcohol-based resin may have any suitable average degree of polymerization in accordance with the purpose. The average degree of polymerization is preferably 1,200 to 3,600. The average degree of polymerization of the polyvinyl alcohol-based resin can be measured through a method in accordance with JIS K6726-1994.

As a method of obtaining a polymer film mainly containing the polyvinyl alcohol-based resin, any suitable forming method can be adopted. As a specific example of the forming method, there is a method described in JP 2000-315144 A [Example 1].

A polymer film containing the polyvinyl alcohol-based resin as a main component preferably contains a plasticizer and/or a surfactant. Examples of the plasticizer include polyhydric alcohols such as ethylene glycol and glycerin. An example of the surfactant includes a non-ionic surfactant. The contents of the plasticizer and surfactant are preferably more than 1 to 10 parts by weight with respect to 100 parts by weight of a polyvinyl alcohol-based resin. The polyhydric alcohol and the surfactant are used for the purpose of further enhancing the dyeability and stretch ability of a polarizer.

As the polymer film mainly containing the polyvinyl alcohol-based resin, a commercially available product can be used as it is. Specific examples of the commercially available polymer film mainly containing a polyvinyl alcohol-based resin include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by The Nippon Synthetic Chemical Industry, Co., Ltd.

Figure 3:
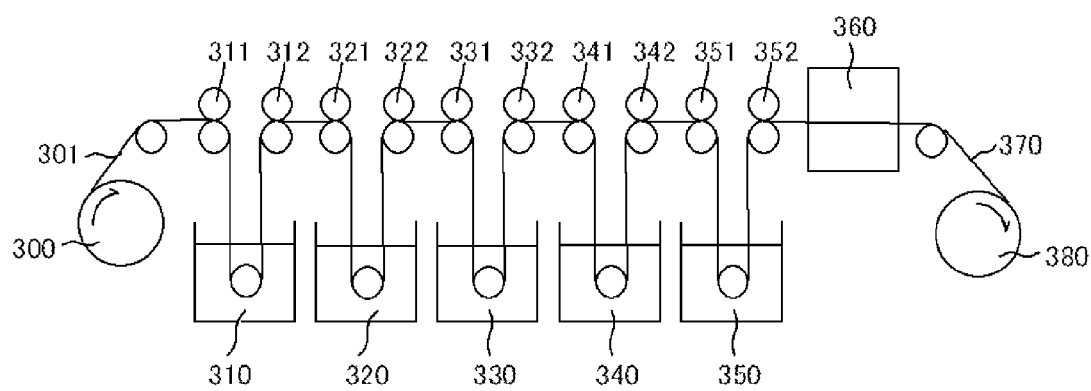
FIG. 3 A schematic diagram illustrating a concept of a typical production process of a polarizer used in the present invention.

An example of the method of producing a polarizer will be described referring to FIG. 3. FIG. 3 is a schematic view showing a concept of a typical method of producing a polarizer used in the present invention. For example, a polymer film 301 containing a polyvinyl alcohol-based resin as a main component is fed from a feed part 300, immersed in a swelling bath 310 containing pure water and a coloring bath 320 containing an aqueous iodine solution, so as to be subjected to swelling treatment and coloring treatment under tension in a longitudinal direction of the film by rollers 311, 312, 321, and 322 at different speed ratios. Next, the film subjected to swelling treatment and coloring treatment is immersed in a first cross linking bath 330 and a second cross linking bath 340 containing potassium iodide, so as to be subjected to cross linking treatment and final stretching treatment under tension in a longitudinal direction of the film by rollers 331, 332, 341, and 342 at different speed ratios. The film subjected to cross linking treatment is immersed in a water washing bath 350 containing pure water by rollers 351 and 352, so as to be subjected to water washing treatment. The film subjected to water washing treatment is dried by drying means 360 to adjust its moisture content at, for example, 10% to 30%, and taken up in a take-up part 380. The polymer film containing a polyvinyl alcohol-based resin as a main component may be stretched to a 5 times to 7 times length of the original length through the above-mentioned processes, to thereby obtain a polarizer 370.

In the above coloring process, the adding amount of iodine in a coloring bath is preferably 0.01 parts by weight to 0.15 parts by weight, and more preferably 0.01 parts by weight to 0.05 parts by weight with respect to 100 parts by weight of water. By setting the adding amount of iodine in a coloring bath in the above range, a polarizer having excellent optical properties can be obtained. When the adding amount of iodine in a coloring bath is increased in the above range, a polarizer with low light transmittance can be obtained. Further, when the adding amount of iodine in a coloring bath is decreased in the above range, a polarizer with high light transmittance can be obtained.

The adding amount of potassium iodide in the above coloring bath is preferably 0.05 parts by weight to 0.5 parts by weight, and more preferably 0.1 parts by weight to 0.3 parts by weight with respect to 100 parts by weight of water. By setting the adding amount of potassium iodide in the above range, a polarizer with a light transmittance in a preferred range and high degree of polarization can be obtained.

In the above cross-linking process, the adding amount of potassium iodide in the first cross-linking bath and the second cross-linking bath is preferably 0.5 parts by weight to 10 parts by weight, and more preferably 1 part by weight to 7 parts by weight with respect to 100 parts by weight of water. The adding amount of boric acid in the first cross-linking bath and the second cross-linking bath is preferably 0.5 parts by weight to 10 parts by weight, and more preferably 1 part by weight to 7 parts by weight. By setting the adding amount of potassium iodide and boric acid in the above range, a polarizer having excellent optical properties with a light transmittance in a preferred range and high degree of polarization can be obtained.

The thickness of the polarizer is not particularly limited, and includes a general concept of a thin film, a film, and a sheet. The thickness of the polarizer is generally 1 μm to 250 μm, and preferably 20 μm to 250 μm. By setting the thickness of the polarizer in the above range, a polarizer with excellent mechanical strength can be obtained.

As the polarizers, for example, those which have different light transmittances may be selected from commercially available products and appropriately used in combination.

<D. First Optical Compensation Layer>

The first optical compensation layer has a refractive index profile of nx>ny>nz. $Re_{1[}590]$ of the first optical compensation layer is preferably 30 to 250 nm, more preferably 40 to 150 nm, and particularly preferably 45 to 100 nm. By setting $Re_{1[}590]$ in the above range, a liquid crystal panel having high contrast ratios in front and oblique directions and exhibiting excellent display properties may be obtained.

The Nz coefficient of the first optical compensation layer exhibits a relationship of preferably 2<Nz<4 and more preferably 2.1<Nz<3. In another embodiment, the Nz coefficient of the first optical compensation layer exhibits a relationship of preferably 2<Nz<4, more preferably 2.4<Nz<3.7, and particularly preferably 2.6<Nz<3.5. By setting the Nz coefficient in the above range, a liquid crystal panel having high contrast ratios in front and oblique directions and exhibiting excellent display properties may be obtained.

The thickness of the first optical compensation layer may be set so that a desired in-plane retardation is obtained. Specifically, the thickness of the first optical compensation layer is preferably 20 to 110 μm, more preferably 25 to 105 μm, and particularly preferably 30 to 100 μm.

The absolute value of a photoelastic coefficient of the first optical compensation layer is preferably $40 \times 10^{-12}$ (m$^2$/N) or less, more preferably $0.2 \times 10^{-12}$ to $35 \times 10^{-12}$ (m$^2$/N), and particularly preferably $0.2 \times 10^{-12}$ to $30 \times 10^{-12}$ (m$^2$/N). If the absolute value of the photoelastic coefficient is in such a range, display unevenness may be suppressed effectively.

It is preferred that the first optical compensation layer have the following relationship of Expression (1).

$$Re_1[380] \leq Re_1[550] \leq Re_1[780] \quad (1)$$

Here, for example, $Re_1[380]=Re_1[550]$ includes not only the case where $Re_1[380]$ is strictly equal to $Re_1[550]$ but also the case where they are substantially equal to each other. In the specification of the present invention, the term "substantially equal" is intended to include the case where, for example, $Re_1[380]$ is different from $Re_1[550]$ in a range not having a practical effect on the display properties of the liquid crystal panel of the present invention. Specifically, when $Re_1[380]=Re_1[550]=Re_1[780]$, the difference between a maximum value and a minimum value of $Re_1$ at a wavelength of 380 nm to 780 nm of the first optical compensation layer is preferably 10 nm or less, more preferably 8 nm or less, and particularly preferably 6 nm or less. When $Re_1[380]<Re_1[550]$, $Re_1[380]/Re_1[550]$ is preferably 0.80 to 0.99 and more preferably 0.82 to 0.93. Further, when $Re_1[550]<Re_1[780]$, $Re_1[550]/Re_1[780]$ is preferably 0.80 to 0.99 and more preferably 0.82 to 0.93. If the first optical compensation layer has such wavelength dispersion properties, a color shift may be reduced.

As a material that may form the first optical compensation layer, any suitable material may be adopted as long as the properties as described above may be obtained. Specific examples include cyclic olefin-based resins and cellulose-based resins. More specifically, the first optical compensation layer is a polymer film containing, preferably, a cyclic olefin-based resin or cellulose-based resin. The cyclic olefin-based resin film may have so-called flat wavelength dispersion properties ($Re_1[380]=Re_1[550]=Re_1[780]$). The cellulose-based resin film may have so-called reverse wavelength dispersion properties ($Re_1[380]<Re_1[550]<Re_1[780]$).

The cyclic olefin-based resin is a general term for a resin prepared through polymerization of a cyclic olefin as a monomer, and examples thereof include resins described in JP 1-240517 A, JP 3-14882 A, JP 3-122137 A, and the like. Specific examples thereof include: a ring opened (co)polymer of a cyclic olefin; an addition polymer of a cyclic olefin; a copolymer (typically, a random copolymer) of a cyclic olefin, and an α-olefin such as ethylene or propylene; their graft modified products each modified with an unsaturated carboxylic acid or its derivative; and hydrides thereof. A specific example of the cyclic olefin includes a norbornene-based monomer.

Examples of the norbornene-based monomer include: norbornene, its alkyl substitution and/or alkylidene substitution such as 5-methyl-2-norbornene, 5-dimethyl-2-norbornene, 5-ethyl-2-norbornene, 5-butyl-2-norbornene, 5-ethylidene-2-norbornene, and their products each substituted by a polar group such as halogen; dicyclopentadiene and 2,3-dihydrodicyclopentadiene; dimethano octahydronaphtalene, its alkyl substitution and/or alkylidene substitution, and their products each substituted by a polar group such as halogen, for example, 6-methyl-1,4:5,8-dimethano-1,4,4a,5,6, 7, 8,8a-octahydronaphtalene,
6-ethyl-1, 4:5,8-dimethano-1,4,4a,5,6, 7, 8,8a-octahydronaphtalene,
6-ethylidene-1,4:5,8-dimethano-1,4,4a,5,6,7,8,8a-octahydronaphtalene,
6-chloro-1,4:5,8-dimethano-1,4,4a,5,6,7,8,8a-octahydronaphtalene,
6-cyano-1,4:5,8-dimethano-1,4,4a,5,6,7,8,8a-octahydronaphtalene,
6-pyridyl-1,4:5,8-dimethano-1,4,4a,5,6,7,8,8a-octahydronaphtalene, and
6-methoxycarbonyl-1,4:5,8-dimethano-1,4,4a,5,6,7,8,8a-octahydronaphtalene; and a trimer of cyclopentadiene and a tetramer of cyclopentadiene, for example,
4,9:5,8-dimethano-3a,4,4a,5,8,8a,9,9a-octahydro-1H-benzoindene and
4, 11:5, 10:6,9-trimethano-3a,4,4a,5,5a,6,9,9a,10,10a,11,11a-dodecahydro-1H-cyclopentaanthracene.

In the present invention, other ring-opening polymerizable cycloolefins can be combined without impairing the purpose of the present invention. Specific example of such cycloolefin includes a compound having one reactive double-bond, for example, cyclopentene, cyclooctene, and 5,6-dihydrodicyclopentadiene.

The cyclic olefin-based resin has a number average molecular weight (Mn) of preferably 25,000 to 200,000, more preferably 30,000 to 100,000, and most preferably 40,000 to 80,000 measured through a gel permeation chromatography (GPC) method by using a toluene solvent. A number average molecular weight within the above ranges can provide a resin having excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance, light degradation resistance, and the like.

For the cyclic olefin-based resin, various products are commercially available. Specific examples of the resin include the trade names "ZEONEX" and "ZEONOR" each manufactured by ZEON CORPORATION, the trade name "Arton" manufactured by JSR Corporation, the trade name "TOPAS" manufactured by TICONA Corporation, and the trade name "APEL" manufactured by Mitsui Chemicals, Inc.

As the cellulose-based resin, any appropriate compound may be used. The cellulose-based resin is preferably cellulose organic acid esters in which one part or all of the hydroxyl groups of cellulose is substituted with an acetyl group, propionyl group, and/or butyl group, or cellulose-mixed organic acid esters. For example, the cellulose organic acid esters include cellulose acetate, cellulose propionate, cellulose butyrate, and the like. For example, the cellulose-mixed organic acid esters include cellulose acetate propionate, cellulose acetate butyrate, and the like. The cellulose-based resin may be, for example, obtained by a method described in paragraphs [0040] to [0041] in JP 2001-188128 A.

The weight average molecular weight (Mw) of the cellulose-based resin measured by a gel permeation chromatography (GPC) method with a tetrahydrofuran solvent is preferably 20,000 to 1,000,000 and more preferably 25,000 to 800,000. If the weight average molecular weight is in the above range, a cellulose-based resin with excellent mechanical strength and favorable solubility, forming property, and casting operability may be obtained.

The glass transition temperature (Tg) of the cellulose-based resin is preferably 110° C. to 185° C. If Tg is 110° C. or higher, a film with favorable thermal stability is likely to be obtained. If Tg is 185° C. or lower, a film is excellent in formability. Note that the glass transition temperature (Tg) may be obtained by a DSC method in accordance with JIS K 7121.

As the cellulose-based resin film, a commercially available film may be used. Examples of the commercially available cellulose-based resin film include FUJITAC series (trade names; ZRF80S, TD80UF, and TDY-80UL) manufactured by Fuji Photo Film Co., Ltd. and "KC8UX2M" (trade name) manufactured by Konica Minolta Opto, Inc.

The cyclic olefin-based resin film or the cellulose-based resin film may further contain any suitable additive. Examples of the additive include a plasticizer, a thermal stabilizer, a light stabilizer, a lubricant, an antioxidant, a UV absorber, a flame retardant, a colorant, an antistatic agent, a compatibilizing agent, a cross linking agent, and a thickener. The content of the additive is preferably more than 0 part by weight to 10 parts by weight or less, based on 100 parts by weight of a resin (cyclic olefin-based resin or cellulose-based resin) that is a main component.

The first optical compensation layer may be obtained by stretching a film (polymer film) formed of the cyclic olefin-based resin or the cellulose-based resin. Any appropriate forming method may be employed as a method of forming a film from the cyclic olefin-based resin or the cellulose-based resin. Specific examples thereof include a compression molding method, a transfer molding method, an injection molding method, an extrusion molding method, a blow molding method, a powder molding method, an FRP molding method, and a casting method. The extrusion molding method and the casting method are preferred because a film to be obtained may have enhanced smoothness and favorable optical uniformity. Forming conditions may appropriately be set in accordance with the composition or type of resin to be used, properties desired for the first optical compensation layer, and the like. Many film products of the cyclic olefin-based resin and the cellulose-based resin are commercially available, and the commercially available films may be subjected to the stretching treatment.

As the stretching method, any suitable method may be adopted depending upon desired optical properties (for example, a refractive index profile and an Nz coefficient). Specific examples of the stretching method include lateral uniaxial stretching, free-end uniaxial stretching, fixed-end biaxial stretching, fixed-end uniaxial stretching, and sequential biaxial stretching. A specific example of the fixed-end biaxial stretching includes a method of stretching a film in a short direction (lateral direction) while allowing the film to run in a longitudinal direction. This method is apparently lateral uniaxial stretching. Those stretching methods may be used alone or in combination of two or more. For example, there is a method of performing free-end uniaxial stretching and then performing fixed-end uniaxial stretching. Of those, the fixed-end uniaxial stretching is preferred. This is because a film having a desired Nz coefficient and having a refractive index profile of nx>ny>nz is likely to be obtained. Further, a slow axis may be provided in the short direction (width direction) of the film by subjecting the film to the fixed-end uniaxial stretching, and hence, when the slow axis of the film is placed so as to be perpendicular to the absorption axis of the polarizer, the attachment of the film and the polarizer to each other may be performed continuously by roll-to-roll, which enhances a production efficiency.

In the case of using the cyclic olefin-based resin film, a stretching temperature of the film is preferably 130 to 165° C., more preferably 135 to 165° C., and particularly preferably 137 to 165° C. In the case of using the cellulose-based resin film, a stretching temperature of the film is preferably 100 to 170° C., more preferably 105 to 170° C., and particularly preferably 110 to 170° C. Stretching at such a temperature may provide the first optical compensation layer capable of appropriately exerting the effects of the present invention. In the case where the stretching temperature is lower than the preferred temperature, uniform stretching may not be realized. In the case where the stretching temperature is higher than the preferred temperature, desired in-plane retardation required for the first optical compensation layer may not be developed.

In the case of using the cyclic olefin-based resin film, a stretching ratio of the film is preferably 1.2 to 4.0 times, more preferably 1.2 to 3.8 times, and particularly preferably 1.25 to 3.6 times. In the case of using the cellulose-based resin film, a stretching ratio of the film is preferably 1.1 to 2.5 times, more preferably 1.25 to 2.45 times, and particularly preferably 1.4 to 2.4 times. Stretching at such a stretching ratio may provide the first optical compensation layer capable of appropriately exerting the effects of the present invention. In the case where the stretching ratio is smaller than the preferred stretching ratio, desired in-plane retardation required for the first optical compensation layer may not be developed. In the case where the stretching ratio is larger than the preferred stretching ratio, the film may break or become brittle during stretching.

<E. Second Optical Compensation Layer>

The second optical compensation layer has a refractive index profile of nx>ny>nz. The optical properties ($Re_{2[590]}$, $Rth_{2[590]}$, Nz coefficient, photoelastic coefficient, wavelength dispersion properties, etc.) of the second optical compensation layer may be in the same range as the optical properties of the first optical compensation layer. The optical properties of the first optical compensation layer may or may not be the same as the optical properties of the second optical compensation layer.

As the materials for and formation method for the second optical compensation layer, the materials and formation methods described in the Item D may be applied.

<F. Protective Film>

As the protective film, any appropriate film which can be used as a protective film for a polarizing plate may be employed. Specific examples of a material used as a main component of the film include transparent resins such as a cellulose-based resin (such as triacetylcellulose (TAC)), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth) acrylic resin, and an acetate-based resin. Another example thereof includes a (meth) acrylic, urethane-based, (meth) acrylic urethane-based, epoxy-based, or silicone-based thermosetting resin or UV-curing resin. Still another example thereof includes a glassy polymer such as a siloxane-based polymer. Further, a polymer film described in JP 2001-343529 A (WO 01/37007) may also be used. To be specific, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Each of protective layer may be the same as or different from each other.

Glass transition temperature (Tg) of the (meth) acrylic resin is preferably 115° C. or higher, more preferably 120° C. or higher, still more preferably 125° C. or higher, and particularly preferably 130° C. or higher. This is because the (meth) acrylic resin having a glass transition temperature (Tg) of 115° C. or higher can be excellent in durability. The upper limit value of Tg of the (meth)acrylic resin is not particularly limited, but is preferably 170° C. or lower from the viewpoint of formability and the like.

As the (meth)acrylic resin, any appropriate (meth)acrylic resin can be adopted as long as the effects of the present invention are not impaired. Examples of the (meth)acrylic resin include poly(meth)acrylates such as methyl polymethacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (MS resin, etc.), and a polymer having an alicyclic hydrocarbon group (e.g., a methyl methacrylate-cyclohexyl methacrylate copolymer, a methyl methacrylate-norbornyl (meth)acrylate copolymer). A preferred example includes $C_{1-6}$ alkyl poly (meth)acrylate such as polymethyl (meth)acrylate. A more preferred example includes a methyl methacrylate-based resin containing methyl methacrylate as a main component (50 to 100% by weight, preferably 70 to 100% by weight).

Specific examples of the (meth)acrylic resin include ACRYPET VH and ACRYPET VRL20A manufactured by Mitsubishi Rayon Co., Ltd., a (meth)acrylic resin having a ring structure in molecules described in JP 2004-70296 A, and a (meth)acrylic resin with high Tg obtained by intramolecular cross-linking or intramolecular cyclization reaction.

As the above (meth) acrylic resin, a (meth) acrylic resin having a lactone ring structure is particularly preferred because of high heat resistance, high transparency, and high mechanical strength.

Examples of the (meth) acrylic resin having the lactone ring structure include (meth)acrylic resins having a lactone ring structure described in JP 2000-230016 A, JP 2001-151814 A, JP 2002-120326 A, JP 2002-254544 A, and JP 2005-146084 A.

The mass average molecular weight (which may also be referred to as weight average molecular weight) of the (meth) acrylic resin having a lactone ring structure is preferably 1,000 to 2,000,000, more preferably 5,000 to 1,000,000, much more preferably 10,000 to 500,000, and particularly preferably 50,000 to 500,000.

The glass transition temperature (Tg) of the (meth) acrylic resin having the lactone ring structure is preferably 115° C. or higher, more preferably 125° C. or higher, still more preferably 130° C. or higher, particularly preferably 135° C. or higher, and most preferably 140° C. or higher. This is because the (meth) acrylic resin having a lactone ring structure and having Tg of 115° C. or higher can be excellent in durability. The upper limit value of the Tg of the (meth)acrylic resin having a lactone ring structure is not particularly limited, but is preferably 170° C. or lower from the viewpoint of formability and the like.

In this specification, the term "(meth) acrylic" refers to acrylic and/or methacrylic.

The protective layers are preferably transparent and colorless. The thickness direction retardation (Rth) of the protective layer is preferably −90 nm to +90 nm, more preferably −80 nm to +80 nm, and much more preferably −70 nm to +70 nm.

As the thickness of the protective layer, any suitable thickness can be adopted as long as the above preferred thickness direction retardation Rth can be obtained. The thickness of the protective layer is typically 5 mm or less, preferably 1 mm or less, more preferably 1 to 500 μm, and much more preferably 5 to 150 μm.

The side of the protective layer provided on the outside of the polarizer, opposite to the polarizer, (outermost side of the liquid crystal panel) may be subjected to, if required, hard coat treatment, reflection prevention treatment, sticking prevention treatment, antiglare treatment, and the like.

The thickness direction retardation (Rth) of the first protective layer provided between the first polarizer and the first optical compensation layer and the third protective layer provided between the second polarizer and the second optical compensation layer (hereinafter, those protective layers may be respectively referred to as an inside protective layer) is preferably even smaller than the above preferred value. As described above, when the cellulose-based film generally used as a protective film is, for example, a triacetylcellulose film, the thickness direction retardation (Rth) is about 60 nm in a thickness of 80 μm. Then, an inside protective layer may be obtained preferably by subjecting a cellulose-based film with a large thickness direction retardation (Rth) to an appropriate treatment for reducing the thickness direction retardation (Rth).

As treatment for decreasing the above thickness direction retardation (Rth), any suitable treatment method can be adopted. Examples thereof include a method of attaching a base made of polyethylene terephthalate, polypropylene, stainless steel or the like with a solvent such as cyclopentanone or methylethylketone applied thereto to a general cellulose-based film, drying the laminate by heating (for example, for about 3 to 10 minutes at about 80 to 150° C.), and thereafter peeling the base; and a method of applying a solution in which a norbornene-based resin, an acrylic resin, or the like is dissolved in a solvent such as cyclopentanone or methylethylketone to a general cellulose-based film, drying the laminate by heating (for example, for about 3 to 10 minutes at 80 to 150° C.), and thereafter peeling the applied film.

Examples of materials forming the above cellulose-based film preferably include aliphatic acid-substituted cellulose-based polymers such as diacetylcellulose and triacetylcellulose. Although the acetic acid substitution degree in generally used triacetylcellulose is about 2.8, the thickness direction retardation (Rth) can be controlled to be small preferably by controlling the acetic acid substitution degree to 1.8 to 2.7, and more preferably by controlling the propionic acid substitution degree to 0.1 to 1.

By adding a plasticizer such as dibutylphthalate, p-toluenesulfonanilide, or acetyltriethyl citrate to the above aliphatic acid-substituted cellulose-based polymer, the thickness direction retardation (Rth) can be controlled to be small. The adding amount of the plasticizer is preferably 40 parts by weight or less, more preferably 1 to 20 parts by weight, and much more preferably 1 to 15 parts by weight with respect to 100 parts by weight of the aliphatic acid-substituted cellulose-based polymer.

The treatment methods of decreasing the above thickness direction retardation (Rth) may be used in an appropriate combination. The thickness direction retardation Rth (550) of the inside protective layer obtained by the treatment is preferably −20 nm to +20 nm, more preferably −10 nm to +10 nm, much more preferably −6 nm to +6 nm, and particularly preferably −3 nm to +3 nm. The in-plane retardation Re(550) of the inside protective layer is preferably 0 nm or more and 10 nm or less, more preferably 0 nm or more and 6 nm or less, and much more preferably 0 nm or more and 3 nm or less.

As the thickness of the inside protective layer, any suitable thickness may be adopted as long as the preferred thickness direction retardation Rth may be obtained. The thickness of the inside protective layer is preferably 20 to 200 μm, more preferably 30 to 100 μm, and still more preferably 35 to 95 μm.

<G. Method of Producing a Liquid Crystal Panel>

The liquid crystal panel of the present invention may be produced, for example, by successively laminating the constituent elements (first and second optical compensation layers, first and second polarizers, etc.) on a liquid crystal cell. Alternatively, for example, a first laminate in which the first polarizer and the first optical compensation layer are laminated and a second laminate in which the second polarizer and the second optical compensation layer are laminated may be produced, and then, the first and second laminates may be attached to a liquid crystal cell to produce the liquid crystal panel.

As a method of laminating each constituent element of the liquid crystal panel, any suitable method may be adopted. Typically, each constituent element is laminated via any suitable pressure-sensitive adhesive layer or adhesive layer (not shown). As described above, when the first (second) optical compensation layer may function as the protective layer of the first (second) polarizer, the first (second) polarizer and the first (second) optical compensation layer are laminated preferably via a water-soluble adhesive layer containing a polyvinyl alcohol-based resin as a main component.

The water-soluble adhesive layer containing a polyvinyl alcohol-based resin as a main component is preferably formed of an adhesive composition containing a polyvinyl alcohol-based resin, a cross-linking agent, and a metal compound colloid with an average particle diameter of 1 to 100 nm.

Examples of the above polyvinyl alcohol-based resin include a polyvinyl alcohol resin and a polyvinyl alcohol resin containing an acetoacetyl group. The polyvinyl alcohol resin containing an acetoacetyl group is preferred since durability can be enhanced.

Examples of the above-mentioned polyvinyl alcohol-based resin include: a saponified polyvinyl acetate and derivatives of the saponified product; a saponified product of a copolymer obtained by copolymerizing vinyl acetate with a monomer having copolymerizability; and a modified polyvinyl alcohol obtained by modifying polyvinyl alcohol to acetal, urethane, ether, graft, or phosphate. Examples of the monomer include unsaturated carboxylic acids such as maleic acid (anhydrides), fumaric acid, crotonic acid, itaconic acid, and (meth)acrylic acid and esters thereof; α-olefin such as ethylene and propylene; (sodium) (meth) allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. Those resins may be used alone or in combination.

The polyvinyl alcohol-based resin has an average degree of polymerization of preferably about 100 to 5,000, and more preferably 1,000 to 4,000, from a viewpoint of adhesion property. The polyvinyl alcohol-based resin has an average degree of saponification of preferably about 85 to 100 mol %, and more preferably 90 to 100 mol %, from a viewpoint of adhesion property.

The above polyvinyl alcohol-based resin containing an acetoacetyl group is obtained, for example, by reacting a polyvinyl alcohol-based resin with diketene by any method. Specific examples thereof include a method of adding diketene to a dispersion in which a polyvinyl alcohol-based resin is dispersed in a solvent such as acetic acid, a method of adding diketene to a solution in which a polyvinyl alcohol-based resin is dissolved in a solvent such as dimethylformamide or dioxane, and a method of bringing diketene gas or liquid diketene into direct contact with a polyvinyl alcohol-based resin.

The acetoactyl group modification degree of the above polyvinyl alcohol-based resin containing an acetoacetyl group is typically 0.1 mol % or more, preferably about 0.1 to 40 mol %, more preferably 1 to 20 mol %, and particularly preferably 2 to 7 mol %. When the modification degree is less than 0.1 mol %, water resistance may be insufficient. When the modification degree exceeds 40 mol %, the effect of the enhancement of water resistance is small. The acetoacetyl group modification degree is a value measured by NMR.

As the cross-linking agent, any appropriate cross-linking agent may be employed. Preferably, a compound having at least two functional groups each having reactivity with a polyvinyl alcohol-based resin can be used as a cross-linking agent. Examples of the compound include: alkylene diamines having an alkylene group and two amino groups such as ethylene diamine, triethylene diamine, and hexamethylene diamine; isocyanates such as tolylene diisocyanate, hydrogenated tolylene diisocyanate, trimethylol propane tolylene diisocyanate adduct, triphenylmethane triisocyanate, methylene bis(4-phenylmethane)triisocyanate, isophorone diisocyanate, and ketoxime blocked compounds thereof or phenol blocked compounds thereof; epoxides such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino-formaldehyde resin such as a condensate of formaldehyde with methylolurea, methylolmelamine, alkylated methylolurea, alkylated methylol melamine, acetoguanamine, or benzoguanamine; and salts of sodium, potassium, divalent metals or trivalent metals such as magnesium, calcium, aluminum, iron, and nickel and oxides thereof. Of those, an amino-formaldehyde resin and dialdehydes are preferred. As the amino-formaldehyde resin, a compound having a methylol group is preferred, and as the dialdehydes, glyoxal is preferred. Of those, a compound having a methylol group is preferred, and methylol melamine is particularly preferred.

The blending amount of the above cross-linking agent can be appropriately set depending upon the kind of the above polyvinyl alcohol-based resin and the like. Typically, the blending amount of the above cross-linking agent is about 10 to 60 parts by weight, and preferably 20 to 50 parts by weight based on 100 parts by weight of the polyvinyl alcohol-based resin. This is because the cross-linking agent in such a blending amount can contribute to an excellent adhesion. In the case where the blending amount of the cross-linking agent is large, the reaction of the cross-linking agent proceeds in a short period of time, and an adhesive tends to be gelled. Consequently, the usable time (pot life) of the adhesive becomes extremely short, which may make it difficult to use the adhesive industrially. The adhesive of the present embodiment contains a metal compound colloid described later, so the adhesive can be used with good stability even in the case where the blending amount of the cross-linking agent is large.

The above metal compound colloid can have a configuration in which metal compound fine particles are dispersed in a dispersion medium, and can be electrostatically stabilized due to the interaction between the same charges of the fine particles to have stability perpetually. The average particle diameter of the fine particles forming a metal compound colloid can be any suitable value as long as the optical properties such as polarization properties are not adversely influenced. The average particle diameter is preferably 1 to 100 nm, and more preferably 1 to 50 nm. This is because the fine particles can be dispersed uniformly in an adhesive layer to keep adhesion, and the occurrence of knick defects can be suppressed. The "knick defects" refer to light leakage. The detail thereof will be described later.

The metal compound may adopt any appropriate compound. Examples thereof include: a metal oxide such as alumina, silica, zirconia, or titania; a metal salt such as aluminum silicate, calcium carbonate, magnesium silicate, zinc carbonate, barium carbonate, or calcium phosphate; and a mineral such as celite, talc, clay, or kaolin. As described below, a metal compound colloid having a positive charge is preferably used in the present invention. Examples of the metal compound having a positive charge include alumina and titania, and alumina is particularly preferred.

The metal compound colloid is typically present in a state of a colloid solution in which the metal compound colloid is dispersed in a dispersion medium. Examples of the dispersion medium include water and alcohols. The concentration of a solid content in a colloid solution is typically about 1 to 50% by weight, and preferably 1 to 30% by weight. The colloid solution can contain acids such as nitric acid, hydrochloric acid, and acetic acid as a stabilizer.

The blending amount of the above metal compound colloid (solid content) is preferably 200 parts by weight or less, more preferably 10 to 200 parts by weight, much more preferably 20 to 175 parts by weight, and most preferably 30 to 150 parts by weight based on 100 parts by weight of the polyvinyl alcohol-based resin. This is because such a blending amount can suppress the occurrence of knick defects while keeping adhesion.

The adhesive composition of the present embodiment can contain: a coupling agent such as a silane coupling agent and a titanium coupling agent; various kinds of tackifiers; a UV absorber; an antioxidant; and stabilizers such as a heat-resistant stabilizer and a hydrolysis-resistant stabilizer.

The form of the adhesive composition of the present embodiment is preferably an aqueous solution (resin solution). The resin concentration is preferably 0.1 to 15% by weight and more preferably 0.5 to 10% by weight in terms of applicability, shelf stability, and the like. The viscosity of the resin solution is preferably 1 to 50 mPa·s. According to the adhesive composition of the present embodiment, the occurrence of knick defects may be suppressed even in the range of a low viscosity of 1 to 20 mPa·s. The pH of the resin solution is preferably 2 to 6, more preferably 2.5 to 5, still more preferably 3 to 5, and most preferably 3.5 to 4.5. Usually, the surface charge of a metal compound colloid may be controlled by adjusting the pH. The surface charge is preferably a positive charge. The presence of a positive charge may further suppress the occurrence of knick defects. Note that, the surface charge may be checked, for example, by measuring the zeta potential with a zeta potential measurement device.

As a method of preparing the above resin solution, any suitable method can be adopted. For example, there is a method of previously mixing a polyvinyl alcohol-based resin with a cross-linking agent and adjusting the mixture to an appropriate concentration, and blending a metal compound colloid with the resultant mixture. Alternatively, after a polyvinyl alcohol-based resin is mixed with a metal compound colloid, a cross-linking agent can be mixed with the mixture considering a use time and the like. The concentration of the resin solution may be adjusted after preparation of a resin solution.

The thickness of the adhesive layer formed of the above adhesive composition is preferably 10 to 300 nm, more preferably 10 to 200 nm, and particularly preferably 20 to 150 nm.

<H. Liquid Crystal Display Apparatus>

Figure 4:
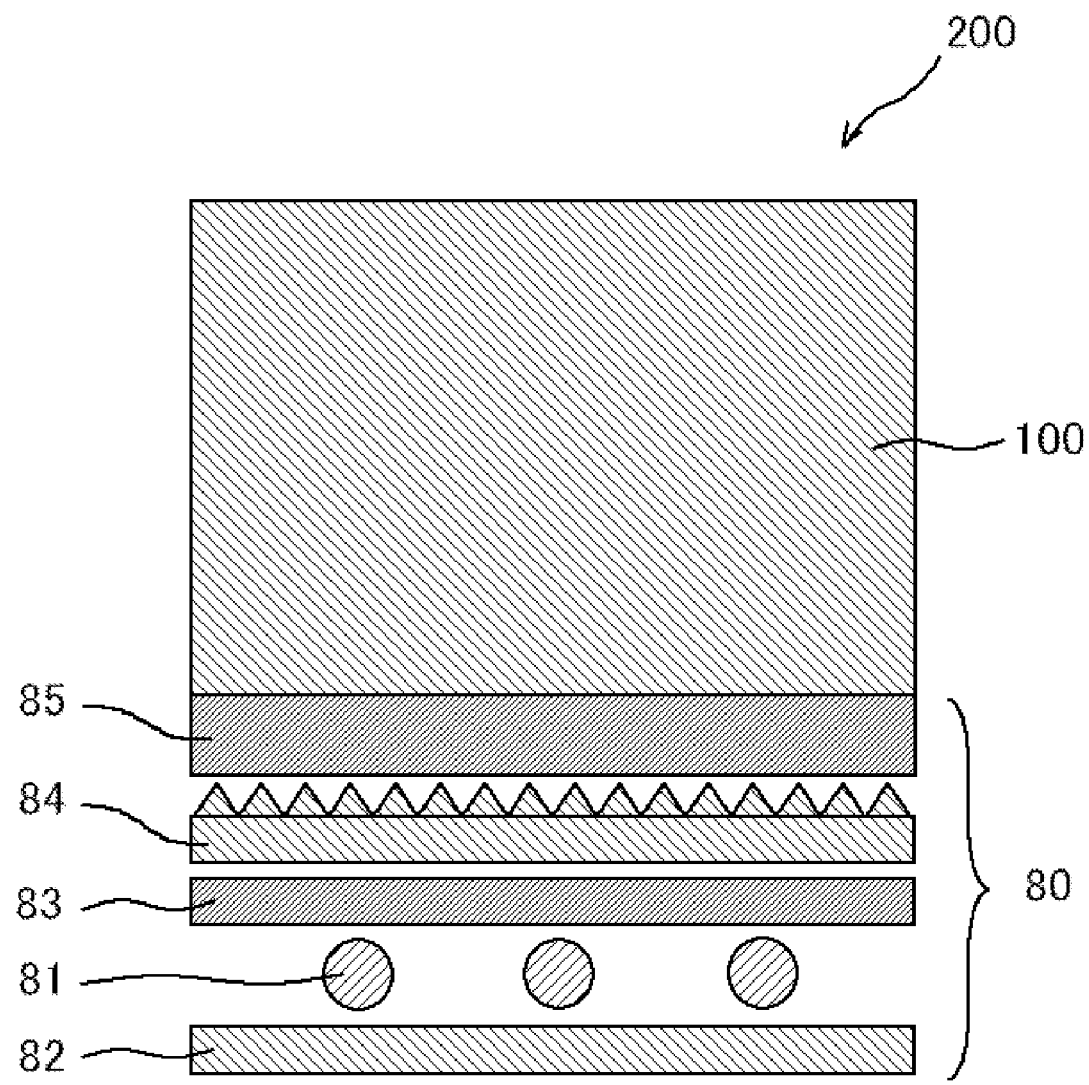
FIG. 4 A schematic cross-sectional view of a liquid crystal display apparatus according to a preferred embodiment of the present invention.

The liquid crystal display apparatus of the present invention includes the above liquid crystal panel. FIG. 4 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 4 is different from the actual one. A liquid crystal display apparatus 200 at least includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, a prism sheet 84, and a brightness enhancing film 85. In the case where the sidelight-type is adopted, the backlight unit preferably further includes a light guide plate and a light reflector. As long as the effects of the present invention are obtained, a part of the optical member illustrated in FIG. 4 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type.

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

Preferably, the liquid crystal display apparatus of the present invention is applied to a television. The screen size of the television is preferably wide 17-type (373 mm×224 mm) or more, more preferably wide 23-type (499 mm×300 mm) or more, and particularly preferably wide 32-type (687 mm×412 mm) or more.

EXAMPLES

The present invention will be described in more detail by using the following examples and comparative examples. However, the present invention is not limited to the examples. Analytical methods used in the examples are described below.

(1) Light Transmittance of Polarizer:

A light transmittance (T) is a Y-value obtained through a visibility correction by a two-degree field of view (C light source) in accordance with JIS Z 8701-1982.

(2) Retardation value (Re, Rth):

"KOBRA21-ADH" (trade name, manufactured by Oji Scientific Instruments) was used. The measurement wavelength was 590 nm, and the measurement temperature was 23° C.

Reference Example 1

Preparation of an Adhesive Composition 50 parts by weight of methylol melamine were dissolved in pure water under a temperature condition of 30° C. with respect to 100 parts by weight of an acetoacetyl-group-containing polyvinyl alcohol-based resin (average polymerization degree: 1,200, saponification degree: 98.5 mol %, and acetoacetylation degree: 5 mol %) to obtain an aqueous solution of a solid content concentration of 3.7%. To 100 parts by weight of the aqueous solution, 18 parts by weight of an alumina colloid aqueous solution (average particle diameter: 15 nm, solid content concentration: 10%, and positively charged) were added to prepare a polyvinyl alcohol-based adhesive composition containing a metal compound colloid. The viscosity of the obtained adhesive composition was 9.6 mPa·s. The pH of the adhesive composition was 4 to 4.5.

Reference Example 2A

Production of a Polarizer

A polymer film ("VF-PS#7500" (trade name) manufacture by Kuraray Co., Ltd.) with a thickness of 75 μm containing a polyvinyl alcohol-based resin as a main component was soaked in 5 baths under the following conditions [1] to [5] while the tension was being applied to the film in a film longitudinal direction, and stretched so that the final stretching ratio became 6.2 times with respect to the film original length. The stretched film was dried in an air-circulating drying oven at 40° C. for one minute, whereby a polarizer A was produced. The properties of the polarizer A are shown in the following Table 1.

<Conditions>

[1] Swelling bath: pure water at 30° C.

[2] Coloring bath: aqueous solution at 30° C. containing 0.032 parts by weight of iodine with respect to 100 parts by weight of water and 0.2 parts by weight of potassium iodide with respect to 100 parts by weight of water

[3] First cross-linking bath: aqueous solution at 40° C. containing 3% by weight of potassium iodide and 3% by weight of boric acid

[4] Second cross-linking bath: aqueous solution at 60° C. containing 5% by weight of potassium iodide and 4% by weight of boric acid

[5] Washing bath: aqueous solution at 25° C. containing 3% by weight of potassium iodide Reference Example 2B Production of Polarizer A polarizer B was produced by the same conditions and method as those in Reference Example 2A, except that the adding amount of iodine in Condition [2] was 0.031 parts by weight with respect to 100 parts by weight of water. The properties of the polarizer B are shown in the following Table 1.

Reference Example 2C

Production of Polarizer

A polarizer C was produced by the same conditions and method as those in Reference Example 2A, except that the adding amount of iodine in Condition [2] was 0.027 parts by weight with respect to 100 parts by weight of water. The properties of the polarizer C are shown in the following Table 1.

TABLE 1

|  | Polarizer A | Polarizer B | Polarizer C |
| --- | --- | --- | --- |
| Adding amount of iodine (parts by weight)[*1] | 0.032 | 0.031 | 0.027 |
| Light transmittance (%) | 41.5 | 42.6 | 43.5 |
| Content of iodine (% by weight) | 2.95 | 2.77 | 2.09 |

[*1]Parts by weight of iodine with respect to 100 parts by weight of water in coloring bath Reference Example 3

Preparation of a Liquid Crystal Cell

A liquid crystal panel was taken out from a commercially available liquid crystal display apparatus 32-inch liquid crystal television "BRAVIA KDL-32S2500" (trade name, manufactured by Sony Corporation) including a liquid crystal cell of a VA mode, and all the optical films such as polarizing plates placed on upper and lower sides of the liquid crystal cell were removed. The front and reverse surfaces of the liquid crystal cell were washed to obtain a liquid crystal cell A.

Example 1

The polarizer A produced in Reference Example 2A was used as a first polarizer. A polymer film containing a cellulose-based resin with a thickness of 80 μm ("TD80UF" (trade name) manufactured by Fuji Photo Film Co., Ltd.; Re[590]=0 nm and Rth[590]=60 nm) was attached to one surface of the polarizer A via an adhesive composition (thickness of the adhesive layer after drying: 80 nm) prepared in Reference Example 1 to produce the polarizer A provided with a protective layer on one side. A stretched polymer film containing a cyclic olefin-based resin ("ZB14-55124-F1340" (trade name) manufactured by Optes Co., Ltd.; Re[590]=55 nm, Rth[590]=151 nm, and thickness: 70 μm) was attached as a first optical compensation layer to the polarizer side of the obtained polarizer A provided with a protective layer on one side via the adhesive composition (thickness of the adhesive layer after drying: 80 nm) prepared in Reference Example 1 so that the absorption axis of the polarizer and the slow axis of the film were substantially perpendicular to each other. Thus, a polarizing plate 1A with an optical compensation layer was obtained.

The polarizer B produced in Reference Example 2B was used as a second polarizer. A polymer film containing a cellulose-based resin with a thickness of 80 μm ("TD80UF" (trade name) manufactured by Fuji Photo Film Co., Ltd.;

Re[590]=0 nm and Rth[590]=60 nm) was attached to one surface of the polarizer B via an adhesive composition (thickness of the adhesive layer after drying: 80 nm) prepared in Reference Example 1 to produce the polarizer B provided with a protective layer on one side. A stretched polymer film containing a cyclic olefin-based resin ("ZB14-55124-F1340" (trade name) manufactured by Optes Co., Ltd.; Re[590]=55 nm, Rth[590]=151 nm, and thickness: 70 μm) was attached as a second optical compensation layer to the polarizer side of the obtained polarizer B provided with a protective layer on one side via the adhesive composition (thickness of the adhesive layer after drying: 80 nm) prepared in Reference Example 1 so that the absorption axis of the polarizer and the slow axis of the film were substantially perpendicular to each other. Thus, a polarizing plate 1B with an optical compensation layer was obtained.

The polarizing plate 1A with an optical compensation layer was attached to the viewer side of the liquid crystal cell A produced in Reference Example 3 via an acrylic pressure-sensitive adhesive (thickness: 20 μm) so that the absorption axis direction of the polarizer and the long side direction of the liquid crystal cell A were substantially parallel to each other and the first optical compensation layer was opposed to the liquid crystal cell. Then, the polarizing plate 1B with an optical compensation layer was attached to a side (backlight side) opposite to the viewer side of the liquid crystal cell A via an acrylic pressure-sensitive adhesive (thickness: 20 μm) so that the absorption axis direction of the polarizer and the long side direction of the liquid crystal cell A were substantially perpendicular to each other and the second optical compensation layer was opposed to the liquid crystal cell. Thus, a liquid crystal panel 1 was obtained. At this time, the absorption axis direction of the first polarizer and the absorption axis direction of the second polarizer are substantially perpendicular to each other. Further, the slow axis directions of the first optical compensation layer and the second optical compensation layer are perpendicular to each other. The liquid crystal panel 1 was combined with a backlight unit of the original liquid crystal display apparatus to produce a liquid crystal display apparatus 1. The contrast ratio in the front direction of the obtained liquid crystal display apparatus 1, knick of the used polarizing plates with an optical compensation layer, and Δu' v' of the liquid crystal panel 1 were checked as follows. Table 2 shows the results.

<Contrast Ratio>

A backlight was lit in a dark room at 23° C. After the elapse of 30 minutes, a lens was placed at a position 50 cm above the panel, using "BM-5" (trade name) manufactured by Topcon Corporation, and a Y-value in an XYZ display system in the case of displaying a white image and a black image was measured. The contrast ratio "YW/YB" in the front direction was calculated from the Y-value in the white image (YW: white brightness) and the Y-value in the black image (YB: brightness in a black display).

<Evaluation of Knick>

Sample chips with a size of 1,000=×1,000 mm were cut out from the polarizing plates 1A and 1B with an optical compensation layer. The polarizing plate 1A with an optical compensation layer thus cut out was laminated on the polarizing plate 1B with an optical compensation layer placed on a black light under a fluorescent lamp so that the absorption axes of the polarizers of the sample chips were perpendicular to each other. In this state, the number of portions (knick defects) through which light leaked was counted. The case where there was one or less knick defect was evaluated as "A", and the case where there were two or more knick defects was evaluated as "B".

<Azimuth Angle Color Change (Δu'v')>

The color tone of a liquid crystal panel when observed in a normal (front) direction, and the color tone of a liquid crystal panel with an azimuth angle changed in a range of 0 to 360° and a polar angle set to be in a 60° direction were measured, using "EzContrast160D" (trade name) manufactured by ELDIM SA., and plotted on a u'v' chromaticity diagram. An azimuth angle color change (Δu'v') of the liquid crystal panel was obtained from the u'v' chromaticity diagram by the following Expression (1). It is shown that a color shift is larger as the Δu'v' is larger:

$$\Delta u'v' = [(u'-u'i)^2 + (v'-v'i)^2]^{1/2} \quad (1)$$

where u' represents u' in a chromaticity (u', v') when the liquid crystal panel is observed in a normal (front) direction. v' represents v' in a chromaticity (u', v') when the liquid crystal panel is observed in a normal (front) direction. u'i represents u'i in a point (u'i, v'i) farthest from the (u', v') on the u'v' chromaticity. v'i represents v'i at a point (u'i, v'i) farthest from the (u', v') on the u'v' chromaticity.

Example 2

A liquid crystal panel 2 and a liquid crystal display apparatus 2 were produced by the same method as that of Example 1, except for using the polarizer C produced in Reference Example 2C as the second polarizer. The contrast ratio in the front direction of the obtained liquid crystal display apparatus 2, the knick of the used polarizing plates with an optical compensation layer, and the Δu'v' of the liquid crystal panel 2 were checked in the same way as in Example 1. Table 2 shows the results.

Example 3

A liquid crystal panel 3 and a liquid crystal display apparatus 3 were produced by the same method as that of Example 1, except for using stretched polymer films containing a cellulose-based resin ("KC4FR" (trade name) manufactured by Konica Minolta Opto, Inc.; Re[590]=47 nm, Rth[590]=156 nm, and thickness: 40 μm) as the first and second optical compensation layers. The contrast ratio in the front direction of the obtained liquid crystal display apparatus 3, the knick of the used polarizing plates with an optical compensation layer, and the Δu'v' of the liquid crystal panel 3 were checked in the same way as in Example 1. Table 2 shows the results.

Example 4

A liquid crystal panel 4 and a liquid crystal display apparatus 4 were produced by the same method as that of Example 3, except for using the polarizer C as the second polarizer. The contrast ratio in the front direction of the obtained liquid crystal display apparatus 4, the knick of the used polarizing plates with an optical compensation layer, and the Δu'v' of the liquid crystal panel 4 were checked in the same way as in Example 1. Table 2 shows the results.

Example 5

A liquid crystal panel 5 and a liquid crystal display apparatus 5 were produced by the same method as that of Example 1, except for using, as an adhesive, a water-soluble adhesive ("GOHSEFIMER Z200" (trade name) manufactured by Nippon Synthetic Chemical Industry Co., Ltd.) containing a polyvinyl alcohol-based resin as a main component. The contrast ratio in the front direction of the obtained liquid crystal display apparatus 5, the knick of the used polarizing plates with an optical compensation layer, and the Δu'v' of the liquid crystal panel 5 were checked in the same way as in Example 1. Table 2 shows the results.

Example 6

A liquid crystal panel 6 and a liquid crystal display apparatus 6 were produced by the same method as that of Example 5, except for using the polarizer C as the second polarizer. The contrast ratio in the front direction of the obtained liquid crystal display apparatus 6, the knick of the used polarizing plates with an optical compensation layer, and the Δu'v' of the liquid crystal panel 6 were checked in the same way as in Example 1. Table 2 shows the results.

Example 7

A liquid crystal panel 7 and a liquid crystal display apparatus 7 were produced by the same method as that of Example 5, except for using stretched polymer films containing a cellulose-based resin ("KC4FR" (trade name) manufactured by Konica Minolta Opto, Inc.; Re[590]=47 nm, Rth[590]=156 nm, and thickness: 40 μm) as the first and second optical compensation layers. The contrast ratio in the front direction of the obtained liquid crystal display apparatus 7, the knick of the used polarizing plates with an optical compensation layer, and the Δu'v' of the liquid crystal panel 7 were checked in the same way as in Example 1. Table 2 shows the results.

Example 8

A liquid crystal panel 8 and a liquid crystal display apparatus 8 were produced by the same method as that of Example 7, except for using the polarizer C as the second polarizer. The contrast ratio in the front direction of the obtained liquid crystal display apparatus 8, the knick of the used polarizing plates with an optical compensation layer, and the Δu'v' of the liquid crystal panel 8 were checked in the same way as in Example 1. Table 2 shows the results.

Comparative Example 1

A liquid crystal panel 9 and a liquid crystal display apparatus 9 were produced by the same method as that of Example 1, except for using the polarizer B as the first polarizer and using the polarizer A as the second polarizer. The contrast ratio in the front direction of the obtained liquid crystal display apparatus 9, the knick of the used polarizing plates with an optical compensation layer, and the Δu'v' of the liquid crystal panel 9 were checked in the same way as in Example 1. Table 2 shows the results.

Comparative Example 2

A liquid crystal panel 10 and a liquid crystal display apparatus 10 were produced by the same method as that of Comparative Example 1, except for using the polarizer C as the first polarizer. The contrast ratio in the front direction of the obtained liquid crystal display apparatus 10, the knick of the used polarizing plates with an optical compensation layer, and the Δu'v' of the liquid crystal panel 10 were checked in the same way as in Example 1. Table 2 shows the results.

Comparative Example 3

A liquid crystal panel 11 and a liquid crystal display apparatus 11 were produced by the same method as that of Comparative Example 1, except for using the polarizer A as the first polarizer. The contrast ratio in the front direction of the obtained liquid crystal display apparatus 11, the knick of the used polarizing plates with an optical compensation layer, and the Δu'v' of the liquid crystal panel 11 were checked in the same way as in Example 1. Table 2 shows the results.

Comparative Example 4

A liquid crystal panel 12 and a liquid crystal display apparatus 12 were produced by the same method as that of Comparative Example 1, except for using stretched polymer films containing a cellulose-based resin ("KC4FR" (trade name) manufactured by Konica Minolta Opto, Inc.; Re[590]=47 nm, Rth[590]=156 nm, and thickness: 40 μm) as the first and second optical compensation layers. The contrast ratio in the front direction of the obtained liquid crystal display apparatus 12, the knick of the used polarizing plates with an optical compensation layer, and the Δu' v' of the liquid crystal panel 12 were checked in the same way as in Example 1. Table 2 shows the results.

Comparative Example 5

A liquid crystal panel 13 and a liquid crystal display apparatus 13 were produced by the same method as that of Comparative Example 2, except for using stretched polymer films containing a cellulose-based resin ("KC4FR" (trade name) manufactured by Konica Minolta Opto, Inc.; Re[590]=47 nm, Rth[590]=156 nm, and thickness: 40 μm) as the first and second optical compensation layers. The contrast ratio in the front direction of the obtained liquid crystal display apparatus 13, the knick of the used polarizing plates with an optical compensation layer, and the Δu' v' of the liquid crystal panel 13 were checked in the same way as in Example 1. Table 2 shows the results.

Comparative Example 6

A liquid crystal panel 14 and a liquid crystal display apparatus 14 were produced by the same method as that of Comparative Example 3, except for using stretched polymer films containing a cellulose-based resin ("KC4FR" (trade name) manufactured by Konica Minolta Opto, Inc.; Re[590]=47 nm, Rth[590]=156 nm, and thickness: 40 μm) as the first and second optical compensation layers. The contrast ratio in the front direction of the obtained liquid crystal display apparatus 14, the knick of the used polarizing plates with an optical compensation layer, and the Δu'v' of the liquid crystal panel 14 were checked in the same way as in Example 1. Table 2 shows the results.

Comparative Example 7

A liquid crystal panel 15 and a liquid crystal display apparatus 15 were produced by the same method as that of Example 1, except for using the polarizer A provided with a protective layer on one side (i.e., the first optical compensation layer was not provided) produced in Example 1. The contrast ratio in the front direction of the obtained liquid crystal display apparatus 15, the knick of the used polarizing plates with an optical compensation layer, and the Δu'v' of the liquid crystal panel 15 were checked in the same way as in Example 1. Table 3 shows the results.

Comparative Example 8

A liquid crystal panel 16 and a liquid crystal display apparatus 16 were produced by the same method as that of Example 2, except for using the polarizer A provided with a protective layer on one side (i.e., the first optical compensation layer was not provided) produced in Example 1. The contrast ratio in the front direction of the obtained liquid crystal display apparatus 16, the knick of the used polarizing plates with an optical compensation layer, and the Δu'v' of the liquid crystal panel 16 were checked in the same way as in Example 1. Table 3 shows the results.

Comparative Example 9

A liquid crystal panel 17 and a liquid crystal display apparatus 17 were produced by the same method as that of Example 3, except for using the polarizer A provided with a protective layer on one side (i.e., the first optical compensation layer was not provided) produced in Example 1. The contrast ratio in the front direction of the obtained liquid crystal display apparatus 17, the knick of the used polarizing plates with an optical compensation layer, and the Δu'v' of the liquid crystal panel 17 were checked in the same way as in Example 1. Table 3 shows the results.

Comparative Example 10

A liquid crystal panel 18 and a liquid crystal display apparatus 18 were produced by the same method as that of Example 4, except for using the polarizer A provided with a protective layer on one side (i.e., the first optical compensation layer was not provided) produced in Example 1. The contrast ratio in the front direction of the obtained liquid crystal display apparatus 18, the knick of the used polarizing plates with an optical compensation layer, and the Δu'v' of the liquid crystal panel 18 were checked in the same way as in Example 1. Table 3 shows the results.

Comparative Example 11

Using 2,2'-bis(3,4-dicarboxyphenyl) hexafluoropropane (6FDA) and 2,2'-bis(trifluoromethyl)-4,4'-diaminobiphenyl (PFMB or TFMB) as starting materials, polyimide was prepared by an ordinary method. A solution prepared by dissolving the obtained polyimide in cyclohexanone so that the concentration was 15% by weight was applied to a PET film (thickness: 50 μm) to a thickness of 30 μm. Then, the resultant was subjected to dry treatment at 100° C. for 10 minutes, whereby a polyimide film (refractive index profile: $nx=ny>nz$, Re[590]=1.0 nm, Rth[590]=160 nm, thickness: 4 μm) was obtained. A liquid crystal panel 19 and a liquid crystal display apparatus 19 were produced by the same method as that of Example 1, except for using the obtained polyimide film as a second optical compensation layer. The contrast ratio in the front direction of the obtained liquid crystal display apparatus 19, the knick of the used polarizing plates with an optical compensation layer, and the Δu'v' of the liquid crystal panel 19 were checked in the same way as in Example 1. Table 3 shows the results.

Comparative Example 12

A liquid crystal panel 20 and a liquid crystal display apparatus 20 were produced by the same method as that of Example 2, except for using the polyimide film produced in Comparative Example 11 as the second optical compensation layer. The contrast ratio in the front direction of the obtained liquid crystal display apparatus 20, the knick of the used polarizing plates with an optical compensation layers, and the Δu'v' of the liquid crystal panel 20 were checked in the same way as in Example 1. Table 3 shows the results.

Comparative Example 13

A liquid crystal panel 21 and a liquid crystal display apparatus 21 were produced by the same method as that of Example 3, except for using the polyimide film produced in Comparative Example 11 as the second optical compensation layer. The contrast ratio in the front direction of the obtained liquid crystal display apparatus 21, the knick of the used polarizing plates with an optical compensation layer, and the Δu'v' of the liquid crystal panel 21 were checked in the same way as in Example 1. Table 3 shows the results.

Comparative Example 14

A liquid crystal panel 22 and a liquid crystal display apparatus 22 were produced by the same method as that of Example 4, except for using the polyimide film produced in Comparative Example 11 as the second optical compensation layer. The contrast ratio in the front direction of the obtained liquid crystal display apparatus 22, the knick of the used polarizing plates with an optical compensation layers, and the Δu'v' of the liquid crystal panel 22 were checked in the same way as in Example 1. Table 3 shows the results.

TABLE 2

| | First and second optical compensation layers | | | | | First polarizer | | Second polarizer | | ΔT | Contrast | | Evaluation |
| | Forming material | Re value (nm) | Rth value (nm) | Nz coefficient | Adhesive*1 | No. | $T_1$ (%) | No. | $T_2$ (%) | ($T_2 - T_1$) | ratio | Δu'v' | of knick |
|---|---|---|---|---|---|---|---|---|---|---|---|---|---|
| Example 1 | Cyclic olefin-based resin | 55 | 151 | 2.8 | PVA-base containing metal compound colloid | A | 41.5 | B | 42.6 | 1.1 | 2,240 | 0.034 | A |
| Example 2 | Cyclic olefin-based resin | 55 | 151 | 2.8 | PVA-base containing metal compound colloid | A | 41.5 | C | 43.5 | 2.0 | 2,202 | 0.038 | A |
| Example 3 | Cellulose-based resin | 47 | 156 | 3.3 | PVA-base containing metal compound colloid | A | 41.5 | B | 42.6 | 1.1 | 1,815 | 0.027 | A |
| Example 4 | Cellulose-based resin | 47 | 156 | 3.3 | PVA-base containing metal compound colloid | A | 41.5 | C | 43.5 | 2.0 | 1,737 | 0.031 | A |

TABLE 2-continued

| | First and second optical compensation layers | | | | | First polarizer | | Second polarizer | | ΔT | Contrast | | Evaluation |
|---|---|---|---|---|---|---|---|---|---|---|---|---|---|
| | Forming material | Re value (nm) | Rth value (nm) | Nz coefficient | Adhesive*[1] | No. | $T_1$ (%) | No. | $T_2$ (%) | $(T_2 - T_1)$ | ratio | Δu'v' | of knick |
| Example 5 | Cyclic olefin-based resin | 55 | 151 | 2.8 | PVA-base | A | 41.5 | B | 42.6 | 1.1 | 2,240 | 0.034 | B |
| Example 6 | Cyclic olefin-based resin | 55 | 151 | 2.8 | PVA-base | A | 41.5 | C | 43.5 | 2.0 | 2,202 | 0.038 | B |
| Example 7 | Cellulose-based resin | 47 | 156 | 3.3 | PVA-base | A | 41.5 | B | 42.6 | 1.1 | 1,815 | 0.027 | B |
| Example 8 | Cellulose-based resin | 47 | 156 | 3.3 | PVA-base | A | 41.5 | C | 43.5 | 2.0 | 1,737 | 0.031 | B |
| Comparative Example 1 | Cyclic olefin-based resin | 55 | 151 | 2.8 | PVA-base containing metal compound colloid | B | 42.6 | A | 41.5 | −1.1 | 2,083 | 0.037 | A |
| Comparative Example 2 | Cyclic olefin-based resin | 55 | 151 | 2.8 | PVA-base containing metal compound colloid | C | 43.5 | A | 41.5 | −2.0 | 1,490 | 0.042 | A |
| Comparative Example 3 | Cyclic olefin-based resin | 55 | 151 | 2.8 | PVA-base containing metal compound colloid | A | 41.5 | A | 41.5 | 0.0 | 1,802 | 0.033 | A |
| Comparative Example 4 | Cellulose-based resin | 47 | 156 | 3.3 | PVA-base containing metal compound colloid | B | 42.6 | A | 41.5 | −1.1 | 1,524 | 0.030 | A |
| Comparative Example 5 | Cellulose-based resin | 47 | 156 | 3.3 | PVA-base containing metal compound colloid | C | 43.5 | A | 41.5 | −2.0 | 1,409 | 0.035 | A |
| Comparative Example 6 | Cellulose-based resin | 47 | 156 | 3.3 | PVA-base containing metal compound colloid | A | 41.5 | A | 41.5 | 0.0 | 1,574 | 0.026 | A |

*[1]PVA is an abbreviation of polyvinyl alcohol.

TABLE 3

| | First and second optical compensation layers | | | | | First polarizer | | Second polarizer | | ΔT | Contrast | | Evaluation |
|---|---|---|---|---|---|---|---|---|---|---|---|---|---|
| | Forming material | Re value (nm) | Rth value (nm) | Nz coefficient | Adhesive*[1] | No. | $T_1$ (%) | No. | $T_2$ (%) | $(T_2 - T_1)$ | ratio | Δu'v' | of knick |
| Comparative Example 7 | First: None Second: Cyclic olefin-based resin | First: — Second: 55 | First: — Second: 151 | First: — Second: 2.8 | PVA-base containing metal compound colloid | A | 41.5 | B | 42.6 | 1.1 | 2,127 | 0.083 | A |
| Comparative Example 8 | First: None Second: Cyclic olefin-based resin | First: — Second: 55 | First: — Second: 151 | First: — Second: 2.8 | PVA-base containing metal compound colloid | A | 41.5 | C | 43.5 | 2.0 | 2,001 | 0.090 | A |
| Comparative Example 9 | First: None Second: Cellulose-based resin | First: — Second: 47 | First: — Second: 156 | First: — Second: 3.3 | PVA-base containing metal compound colloid | A | 41.5 | B | 42.6 | 1.1 | 1,672 | 0.091 | A |
| Comparative Example 10 | First: None Second: Cellulose-based resin | First: — Second: 47 | First: — Second: 156 | First: — Second: 3.3 | PVA-base containing metal compound colloid | A | 41.5 | C | 43.5 | 2.0 | 1,533 | 0.098 | A |
| Comparative Example 11 | First: Cyclic olefin-based resin Second: Polyimide-based resin | First: 55 Second: 1.0 | First: 151 Second: 160 | First: 2.8 Second: — | PVA-base containing metal compound colloid | A | 41.5 | B | 42.6 | 1.1 | 2,223 | 0.067 | A |
| Comparative Example 12 | First: Cyclic olefin-based resin Second: Polyimide-based resin | First: 55 Second: 1.0 | First: 151 Second: 160 | First: 2.8 Second: — | PVA-base containing metal compound colloid | A | 41.5 | C | 43.5 | 2.0 | 2,185 | 0.073 | A |

TABLE 3-continued

| | | First and second optical compensation layers | | | | First polarizer | | Second polarizer | | | Con- | | Eval- uation |
| --- | --- | --- | --- | --- | --- | --- | --- | --- | --- | --- | --- | --- | --- |
| | | Re | Rth | | | | | | | | | | |
| | Forming material | value (nm) | value (nm) | Nz coefficient | Adhesive*[1] | No. | $T_1$ (%) | No. | $T_2$ (%) | $\Delta T$ ($T_2 - T_1$) | trast ratio | $\Delta u'v'$ | of knick |
| Comparative Example 13 | First: Cellulose-based resin Second: Polyimide-based resin | First: 47 Second: 1.0 | First: 156 Second: 160 | First: 3.3 Second: — | PVA-base containing metal compound colloid | A | 41.5 | B | 42.6 | 1.1 | 1,933 | 0.070 | A |
| Comparative Example 14 | First: Cellulose-based resin Second: Polyimide-based resin | First: 47 Second: 1.0 | First: 156 Second: 160 | First: 3.3 Second: — | PVA-base containing metal compound colloid | A | 41.5 | C | 43.5 | 2.0 | 1,845 | 0.078 | A |

*[1]PVA is an abbreviation of polyvinyl alcohol.

As shown in Tables 2 and 3, the liquid crystal panel of the present invention, in which the light transmittance ($T_2$) of the second polarizer is larger than the light transmittance ($T_1$) of the first polarizer, may realize a high contrast ratio. Further, by providing optical compensation layers having a refractive index profile of nx>ny>nz on both sides of the liquid crystal panel, a high contrast ratio may be realized, and an azimuth angle color change may be reduced remarkably.

Further, in the case where the optical compensation layer also functions as a protective layer of the polarizer, knick may be reduced by attaching the optical compensation layer and the polarizer to each other via a polyvinyl alcohol-based adhesive containing a metal compound colloid.

INDUSTRIAL APPLICABILITY

The liquid crystal panel of the present invention and the liquid crystal display apparatus including the liquid crystal panel may be utilized preferably for a personal computer, a liquid crystal television, a mobile telephone, a personal digital assistance (PDA), a projector, or the like.

The invention claimed is:

1. A liquid crystal panel, comprising a first polarizer, a first optical compensation layer, a liquid crystal cell, a second optical compensation layer, and a second polarizer in the stated order from a viewer side,
wherein each of the first optical compensation layer and the second optical compensation layer has a refractive index profile of nx>ny>nz,
a difference ($\Delta T=T_2-T_1$) between the light transmittance ($T_2$) of the entire second polarizer and the light transmittance ($T_1$) of the entire first polarizer is 0.1% to 6.0%,
the light transmittance ($T_1$) of the entire first polarizer is 38.3% to 43.3%, and
the light transmittance ($T_2$) of the entire second polarizer is 41.1% to 44.3%.

2. A liquid crystal panel according to claim 1, wherein an absolute value of a photoelastic coefficient of each of the first optical compensation layer and the second optical compensation layer is $40 \times 10^{-12}$ (m$^2$/N) or less.

3. A liquid crystal panel according to claim 1, wherein the first optical compensation layer and the second optical compensation layer are polymer films containing a cyclic olefin-based resin or a cellulose-based resin.

4. A liquid crystal panel according to claim 1, wherein the liquid crystal cell contains liquid crystal molecules aligned homeotropically.

5. A liquid crystal panel according to claim 1, wherein a polarization degree of at least one of the first polarizer and the second polarizer is 99% or more.

6. A liquid crystal panel according to claim 1, wherein at least one of the first polarizer and the second polarizer comprises a polyvinyl alcohol-based resin containing iodine.

7. A liquid crystal panel according to claim 6, wherein a difference ($\Delta I=I_1-I_2$) between an iodine content ($I_1$) of the first polarizer and an iodine content ($I_2$) of the second polarizer is 0.1% by weight to 2.6% by weight.

8. A liquid crystal panel according to claim 6, wherein at least one of the iodine content ($I_1$) of the first polarizer and the iodine content ($I_2$) of the second polarizer is 1.8% by weight to 5.0% by weight.

9. A liquid crystal display apparatus comprising the liquid crystal panel according to claim 1.

* * * * *